US009432747B2

(12) United States Patent
Gustafsson et al.

(10) Patent No.: US 9,432,747 B2
(45) Date of Patent: Aug. 30, 2016

(54) METER DATA COLLECTION

(71) Applicant: ELSTER SOLUTIONS, LLC, Raleigh, NC (US)

(72) Inventors: Henrik Gustafsson, Raleigh, NC (US); Andrew J. Borleske, Garner, NC (US); Mark Holman, Durham, NC (US); Roberta Yee, Raleigh, NC (US); Nicholas Fountas, Cary, NC (US); Jonathan H. Bailey, Raleigh, NC (US)

(73) Assignee: Elster Solutions, LLC, Raleigh, NC (US)

( * ) Notice: Subject to any disclaimer, the term of this patent is extended or adjusted under 35 U.S.C. 154(b) by 246 days.

(21) Appl. No.: 13/662,056

(22) Filed: Oct. 26, 2012

(65) Prior Publication Data
US 2013/0106616 A1 May 2, 2013

Related U.S. Application Data

(60) Provisional application No. 61/551,594, filed on Oct. 26, 2011, provisional application No. 61/589,590, filed on Jan. 23, 2012.

(51) Int. Cl.
*H04W 52/24* (2009.01)
*H04Q 9/00* (2006.01)

(52) U.S. Cl.
CPC ............ *H04Q 9/00* (2013.01); *H04Q 2209/60* (2013.01)

(58) Field of Classification Search
CPC combination set(s) only.
See application file for complete search history.

(56) References Cited

U.S. PATENT DOCUMENTS

| | | | |
|---|---|---|---|
| 5,539,736 A | 7/1996 | Johnson et al. | |
| 5,790,551 A | 8/1998 | Chan | |
| 5,896,097 A | 4/1999 | Cardozo | |
| 6,005,759 A | 12/1999 | Hart et al. | |
| 6,532,220 B1 | 3/2003 | Carneal et al. | |
| 8,031,082 B2 | 10/2011 | Cornwall | |
| 8,203,463 B2 | 6/2012 | Bragg et al. | |
| 8,300,581 B2 | 10/2012 | Richeson | |
| 2004/0114737 A1* | 6/2004 | MacConnell | 379/106.03 |
| 2005/0068193 A1* | 3/2005 | Osterloh et al. | 340/870.02 |
| 2005/0148372 A1* | 7/2005 | Lowinger | 455/567 |
| 2007/0057813 A1* | 3/2007 | Cahill-O'Brien | H04Q 9/00 340/870.02 |
| 2007/0130408 A1* | 6/2007 | Leach | 710/305 |
| 2008/0044014 A1* | 2/2008 | Corndorf | 380/37 |
| 2008/0150752 A1* | 6/2008 | Klaus et al. | 340/870.02 |
| 2009/0196163 A1 | 8/2009 | Du | |

(Continued)

OTHER PUBLICATIONS

Decision, National Research Development Corporation's Appln., No. 6, Reports of Patent, Design, and Trade Mark Cases, Swift & Company's Application (Patent), 1961,134, 146.
Decision, Reports of Patent , Design, and Trade Mark Cases, *No-Fume v. Frank Pitchford & Co. Ltd.*, vol. LII., No. 7, May 1935, 52.
Decision, International Business Machines Corporation's Application, Jan. 1970, RPC 533.

(Continued)

*Primary Examiner* — Fekadeselassie Girma
*Assistant Examiner* — Cal Eustaquio
(74) *Attorney, Agent, or Firm* — Baker & Hostetler, LLP

(57) ABSTRACT

A metering device may be configured to communicate with other devices in an advanced metering infrastructure (AMI) system. For example, a metering device may be configured to communicate with a collection device. To enable such communications, a collection device may send a wake-up-tone and/or a request message to a metering device. Based on the request message, a metering device may send data to the collection device. Metering communication networks may be mobile and/or fixed. For example, a mobile collection device may use a wireless signal to interrogate a metering device to retrieve data from the metering device.

15 Claims, 8 Drawing Sheets

(56) References Cited

U.S. PATENT DOCUMENTS

2010/0007521 A1* 1/2010 Cornwall ................ 340/870.02
2010/0026517 A1 2/2010 Cumeralto et al.
2010/0026518 A1 2/2010 Cumeralto et al.

OTHER PUBLICATIONS

Khalifa et al., "A Survey of Communication Protocols for Automatic Meter Reading Applications," IEEE Communications Surveys & Tutorials, v.13, n. 2, pp. 168-182, Second Quarter, 2011.

* cited by examiner

| Preamble Length | Guard Time | Time Slot Length | Channels per slot | Number of Endpoints | Endpoint list (address and response channel) | Application Layer |

Figure 5

METER DATA COLLECTION

CROSS REFERENCE TO RELATED APPLICATIONS

This application claims the benefit of U.S. Provisional Patent Application Ser. No. 61/551,594, filed Oct. 26, 2011 and U.S. Provisional Patent Application Ser. No. 61/589,590, filed Jan. 23, 2012, the contents of both of which are hereby incorporated by reference in their entirety.

BACKGROUND

Utilities may use communication systems to read data from electricity, water, and/or gas meters. These communication systems and meters may be installed at customer locations and used to measure consumption and other parameters to determine a customer's monthly bill. Automated systems, such as Automated Meter Reading (AMR) and Advanced Metering Infrastructure (AMI) systems, exist for collecting meter data from meters that measure usage of resources, such as gas, water, and electricity. Such systems may employ various infrastructures for collecting meter data from meters. For example, some automated systems obtain data from meters using a fixed wireless network that includes, for example, a central node (e.g., a collection device) that is in communication with a number of endpoint nodes.

Other AMI or AMR systems use a mobile collection device to collect meter data. Communications can be conducted between the collection device through repeaters to meters that can be referred to as endpoint nodes. Data can be extracted from meters and networks using various communication protocols. At an endpoint node, wireless communication circuitry may be incorporated into the meters themselves. Meters may be interrogated, via wireless communication circuitry, in order to retrieve meter data from the meters. For example, walk-by or drive-by reading systems may use radio communications from a mobile collector device to interrogate meters. Current approaches to interrogating meters lack efficiency. For example, network resources are often misallocated during mobile interrogation.

Further, interrogation typically requires a meter to be powered-on so that the meter can respond to an interrogation. Often meters rely on a low power state to conserve battery power and increase battery life. Returning a device from a low power state to an active, fully powered state is often referred to as waking a device. Various techniques exist for waking a device from a sleep mode. For example, devices might have a button that, when pressed, returns the device to an active mode. Other battery powered devices are capable of being woken remotely. Existing approaches to waking up meter devices might wake-up unintended devices, resulting in unnecessary power consumption, and may be ineffective in waking an intended device.

SUMMARY

Various techniques for collecting meter data are disclosed herein, including a method for waking a meter device, configured to operate in a metering network, from a sleep mode. Methods for determining a transponder range and interrogating meter devices are disclosed. Systems and apparatuses for carrying out these methods are also disclosed.

In an example embodiment, a meter device may receive a request message from a collection device. A request message may serve to interrogate a meter to retrieve data from the meter. The request message may be referred to as an interrogation, and it may be addressed to one or more endpoints (e.g., meter devices). The request message may comprise response parameters such as, for example, a preamble length, a guard time, a time slot length, a number channels per time slot, a number of endpoints, an endpoint list, and an application layer request. Based on the response parameters, an endpoint may determine a time slot during which the endpoint may respond to the request message, and endpoint may determine a frequency channel in which to respond to the request message. The endpoints that are instructed to respond to an interrogation may be identified in the request message. For example, the request message may comprise an endpoint list that identifies endpoints by their respective endpoint addresses. The responses may comprise data that was requested by the collection device in the request message. Depending on the response parameters, more than one metering device may respond to a request message during the same time slot, but at different channels (e.g., frequencies). Similarly, depending on the response parameters in the request message, more than one metering devices may provide data to a collection device using the same frequency channel, but during different time slots.

In another example embodiment, a meter device may be woken from a low power state such as a sleep mode. A meter device may measure a signal strength of a received signal having a carrier frequency. The meter device may determine whether the received signal is a valid wake-up tone based at least in part on whether the measured signal strength is greater than a predetermined threshold. The meter device may determine whether an address encoded within the received signal matches a wake-up address of the device. If the measured signal strength is not greater than the predetermined threshold, the meter device may determine that the received signal is not a valid wake-up tone. If the address encoded within the received signal does not match a wake-up address of the device, then the meter device may determine that the received signal is not a valid wake-up tone. If the measured signal strength is greater than the predetermined threshold and if the address encoded within the received signal matches a wake-up address of the device, then the meter device may determine that the received signal is a valid wake-up tone. According to an embodiment, a collection device may generate and transmit the wake-up tone to one or more endpoints. The wake-up tone may be individually-addressed such that it is intended for a particular device. The wake-up tone may also be broadcast by using a broadcast address such that it is intended for multiple devices.

In another example embodiment, a collection device may be implemented by a mobile interrogator vehicle. Such a mobile interrogator vehicle may travel in a direction. Based on the direction, a collection device may determine a range of transponders for interrogation. The collection device may interrogate the transponders that are within the determined range, for example, to retrieve meter data.

Various embodiments may realize certain advantages. For example, using a request message for multiple endpoints may minimize bandwidth that is used and may decrease communication time. Additionally, a request message may optimize the path of response data. Using a wake-up tone according to disclosed embodiments may allow receivers to conserve power and efficiently detect unwanted signals. Further, embodiments may allow a mobile detection vehicle to travel at an increased speed, thereby increasing the efficiency of reading meter data. Accordingly, embodiments may have increased flexibility and efficiency in collecting meter data.

Other features and advantages of the described embodiments may become apparent from the following detailed description and accompanying drawings.

BRIEF DESCRIPTION OF THE DRAWINGS

FIG. 5 illustrates an example of an outbound data packet structure that can be sent from a mobile collection device;

DETAILED DESCRIPTION OF ILLUSTRATIVE EMBODIMENTS

The ensuing detailed description provides exemplary embodiments and is not intended to limit the scope, applicability, or configuration of the invention. Various changes may be made in the function and/or arrangement of elements and steps without departing from the spirit and scope of the invention.

According to various embodiments described herein, automatic meter reading (AMR) systems may use radio frequency (RF) signals to collect meter reading data from transponders attached to gas, water, and/or electric meters. Each metering device in an AMR systems may use a corresponding transponder to send and receive messages, such as messages comprising consumption data for example. Transponders may be internal or external to metering devices in AMR systems. Such systems may use a mobile interrogator, such as a handheld computer equipped with RF technology and/or a van based RF system for example, to collect meter data. For example, meter data may be collected on a periodic basis or on an as-needed basis, where the meters to be read on a particular day may be collected together in a route. For walk-by and/or drive-by efficiency, a route's meters may be located in a geographically contiguous area.

A plurality of meter devices, which operate to track usage of a service or commodity such as, for example, electricity, water, and/or gas, are operable to wirelessly communicate. One or more devices, referred to herein as "collectors" and/or "mobile interrogators," may "collect" data transmitted by the other meter devices so that it may be accessed by other computer systems. The collection devices may receive and/or compile metering data from a plurality of meter devices via wireless communications. A data collection server may communicate with the collectors to retrieve the compiled meter data. Collection devices may use various techniques described herein to collect meter data. For example, collection devices may interrogate a plurality of meters and may assign each interrogated meter with a particular frequency channel and time slot for responding.

Exemplary Advanced Metering Infrastructure System

Figure 1:
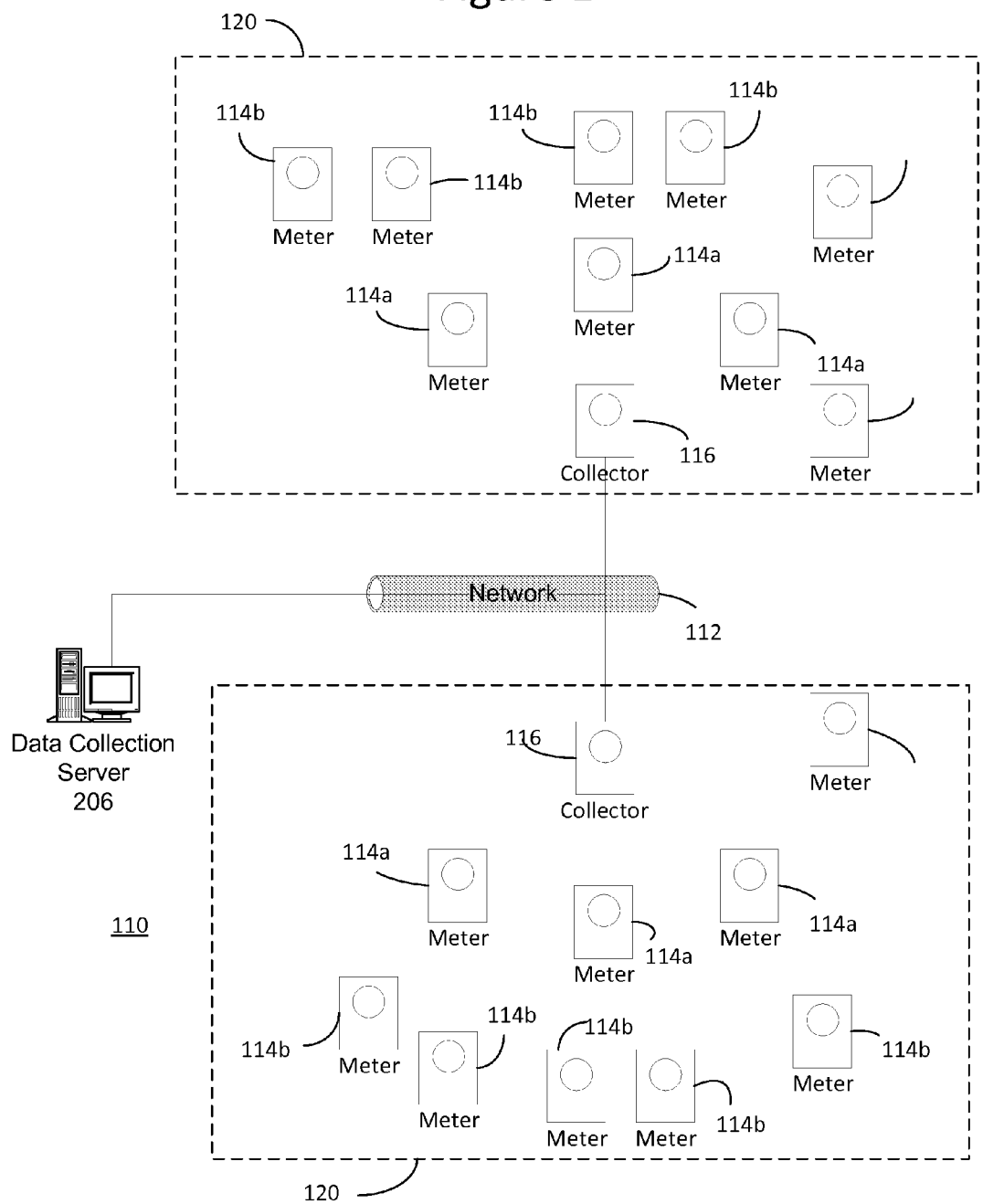
FIG. 1 is a diagram of an exemplary advanced metering infrastructure (AMI) system employing wireless networking.

One example of an advanced metering infrastructure (AMI) system 110 in which the methods and apparatus described herein may be employed is illustrated in FIG. 1. The description given herein with respect to FIG. 1 is for exemplary purposes only and is not intended in any way to limit the scope of potential embodiments.

System 110 comprises a plurality of metering devices, or "meters" 114, which are operable to sense and record consumption or usage of a service or commodity such as, for example, electricity, water, or gas. Meters 114 may be located at customer premises such as, for example, a home or place of business. Meters 114 comprise circuitry for measuring the consumption of the service or commodity being consumed at their respective locations and for generating data reflecting the consumption, as well as other data related thereto. Meters 114 may also comprise circuitry for wirelessly transmitting data generated by the meter to a remote location. Meters 114 may further comprise circuitry for receiving data, commands or instructions wirelessly as well. Meters that are operable to both receive and transmit data may be referred to as "bi-directional" or "two-way" meters (or nodes), while meters that are only capable of transmitting data may be referred to as "transmit-only" or "one-way" meters. In bi-directional meters, the circuitry for transmitting and receiving may comprise a transceiver. In an illustrative embodiment, meters 114 may be, for example, electricity meters manufactured by Elster Solutions, LLC and marketed under the trade name REX.

System 110 further comprises collectors 116. In one embodiment, collectors 116 are also meters operable to detect and record usage of a service or commodity such as, for example, electricity, water, or gas. In addition, collectors 116 are operable to send data to and receive data from meters 114. Thus, like the meters 114, the collectors 116 may comprise both circuitry for measuring the consumption of a service or commodity and for generating data reflecting the consumption and circuitry for transmitting and receiving data. In one embodiment, collector 116 and meters 114 communicate with and amongst one another using any one of several wireless techniques such as, for example, frequency hopping spread spectrum (FHSS) or direct sequence spread spectrum (DSSS). Collectors 116 are also sometimes referred to as "gatekeepers."

The collector 116 may be implemented by a mobile collection device in accordance with an example embodiment. For example, a mobile collection device may comprise a van based RF system or a handheld computer that is equipped with RF technology. Data can be extracted from AMI systems and mesh networks using a variety of communication protocols. Some examples include a one-way protocol (also known as a bubble up protocol), a one-and-a-half way protocol (also known as 1.5-way protocol or a wake-up protocol), and a two way protocol. In the one-way or bubble up protocol, the transponder in each meter broadcasts its meter read data in such a way that the mobile collection device can listen to receive the data. In the 1.5-way or wake-up protocol, the mobile collection device may broadcast a wake-up tone on a designated frequency. For example, a meter within receiving range of the wake-up tone may respond with its meter read data. In the two-way protocol, the mobile collection device may transmit commands that may be directed to particular meters. For example, the mobile collection device may use commands that include identifiers associated with endpoints (e.g., meters 114) that should respond to the commands. For example, the mobile collection device may use commands that include the serial numbers of transponders corresponding to the meters in which the commands are directed. In the two-way protocol, each meter may respond to commands that include its transponder's serial number and each meter may ignore other commands. In this way, the mobile collection device may selectively target certain meters for downloading meter read data.

A collector 116 and the meters 114 with which it communicates may define a subnet or local area network (LAN) 120 of system 110. As used herein, a collector 116 and the meters 114 with which it communicates may be referred to as "nodes" in the subnet/LAN 120. In each subnet/LAN 120, each meter transmits data related to consumption of the commodity being metered at the meter's location. The collector 116 receives the data transmitted by each meter 114, effectively "collecting" it, and then may periodically transmit the data from all of the meters in the subnet/LAN 120 to a data collection server 206. The data collection server 206 stores the data for analysis and preparation of bills, for example. The data collection server 206 may be a specially programmed general purpose computing system and may communicate with collectors 116 via a network 112. The network 112 may comprise any form of network, including a wireless network or a fixed-wire network, such as a local area network (LAN), a wide area network (WAN), the Internet, an intranet, a telephone network, such as the public switched telephone network (PSTN), a Frequency Hopping Spread Spectrum (FHSS) radio network, a mesh network, a Wi-Fi (802.11) network, a Wi-Max (802.16) network, a land line (POTS) network, a TCP/IP network, a W-WAN, a GPRS network, a CDMA network, a Fiber network, or any combination of the above.

A device configuration database 210 may store configuration information regarding the nodes. For example, in the metering system 110, the device configuration database may include data regarding time of use (TOU) switchpoints, etc. for the meters 114 and collectors 116 communicating in the system 110. A data collection requirements database 212 may contain information regarding the data to be collected on a per node basis. For example, a utility may specify that metering data such as load profile, demand, TOU, etc. is to be collected from particular meter(s) 114a. Reports 214 containing information on the network configuration may be automatically generated or in accordance with a utility request.

The network management system (NMS) 204 may maintain a database describing the current state of a global fixed network system (current network state 220) and a database describing the historical state of the system (historical network state 222). The current network state 220 may contain data regarding current meter-to-collector assignments, etc. for each subnet/LAN 120. The historical network state 222 is a database from which the state of the network at a particular point in the past can be reconstructed. The NMS 204 is responsible for, amongst other things, providing reports 214 about the state of a network. The NMS 204 may be accessed via an API 220 that is exposed to a user interface 216 and a Customer Information System (CIS) 218. Other external interfaces may also be implemented. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption, and may be used for billing purposes, etc. by a utility provider.

The network management server 202, network management system 204 and data collection server 206 may communicate with the nodes in each subnet/LAN 120 via the network 112.

Figure 3A:
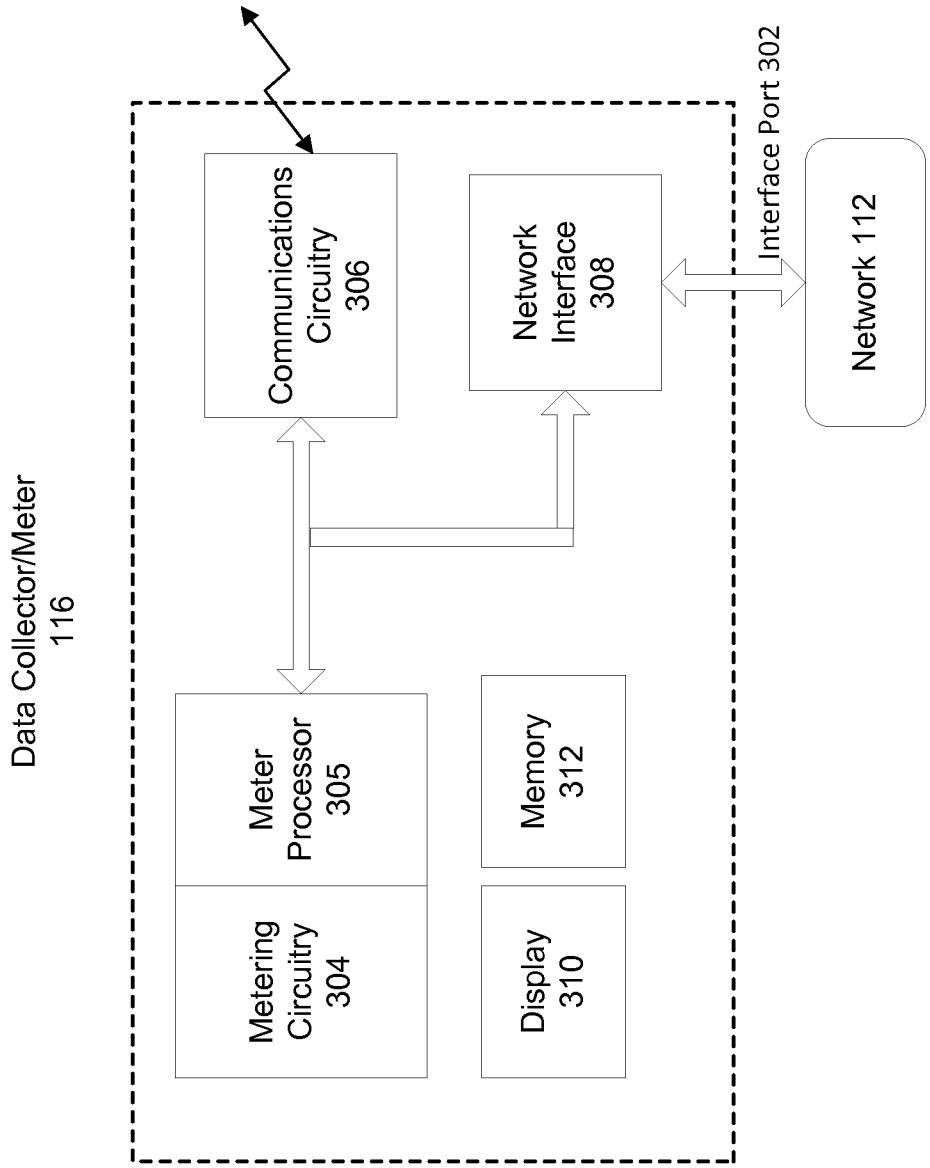
FIG. 3A is a block diagram illustrating an exemplary collector of the metering system of FIG. 1.

FIG. 3A is a block diagram illustrating further details of one embodiment of a collector 116. Although certain components are designated and discussed with reference to FIG. 3A, it should be appreciated that such designations and discussion are not limiting. In fact, various other components typically found in an electronic meter may be a part of collector 116, but have not been shown in FIG. 3A for the purposes of clarity and brevity. Also, other components may be used to accomplish the operation of collector 116. For example, the collector 116 may be implemented as a mobile collection device. The components that are shown and the functionality described for collector 116 are provided as examples, and are not meant to be exclusive of other components or other functionality.

As shown in FIG. 3A, collector 116 may comprise metering circuitry 304 that performs measurement of consumption of a service or commodity and a processor 305 that controls the overall operation of the metering functions of the collector 116. The collector 116 may further comprise a display 310 for displaying information such as measured quantities and meter status and a memory 312 for storing data. The collector 116 further comprises communications circuitry 306 for communicating wirelessly with the meters 114. For example, communications circuitry may communicate with meters 114 via radio frequencies in the VHF/UHF bands or via a LAN. The collector 116 further comprises a network interface 308 for communication over the network 112.

In one embodiment, the metering circuitry 304, processor 305, display 310 and memory 312 are implemented using an A3 ALPHA meter available from Elster Solutions, LLC. In that embodiment, the wireless communications circuitry 306 may be implemented by a LAN Option Board (e.g., a 900 MHz two-way radio) installed within the A3 ALPHA meter, and the network interface 308 may be implemented by a WAN Option Board (e.g., a telephone modem) also installed within the A3 ALPHA meter. In this embodiment, the network interface 308 routes messages from network 112 (via interface port 302) to either the meter processor 305 or the communications circuitry 306. The communication circuitry 306 may use a transceiver (not shown), for example a 900 MHz radio, to communicate data to meters 114. Also, the communications circuitry 306 may have sufficient memory to store data received from meters 114. This data may include, but is not limited to the following: current billing data (e.g., the present values stored and displayed by meters 114), previous billing period data, previous season data, and load profile data.

The communications circuitry 306 may be capable of synchronizing its time to a real time clock (not shown) in A3 ALPHA meter, thereby synchronizing the LAN reference time to the time in the meter. The processing necessary to carry out the communication functionality and the collection and storage of metering data of the collector 116 may be handled by the processor 305 and/or additional processors (not shown) in the communication circuitry 306 and the network interface 308.

The responsibility of a collector 116 may be wide and varied. Generally, collector 116 is responsible for managing, processing and routing data communicated between the collector and network 112 and between the collector and meters 114. Collector 116 may continually or intermittently read the current data from meters 114 and store the data in a database (not shown) in collector 116. Such current data may include but is not limited to the total kWh usage, the Time-Of-Use (TOU) kWh usage, peak kW demand, and other energy consumption measurements and status information. Collector 116 also may read and store previous billing and previous season data from meters 114 and store the data in the database in collector 116. The database may be implemented as one or more tables of data within the collector 116. As described herein, a collector 116 may be implemented as a mobile collection device. Such a collector may also be referred to as interrogator, and the process of requesting data from a meter may be referred to as interrogation.

In one embodiment, the communication circuitry 306 may employ a CC1110 chip available from Texas Instruments, Inc. to implement its wireless transceiver functionality. The CC1110 chip has a built-in Received Signal Strength Indication (RSSI) capability that provides a measurement of the power present in a received radio signal.

Figure 2:
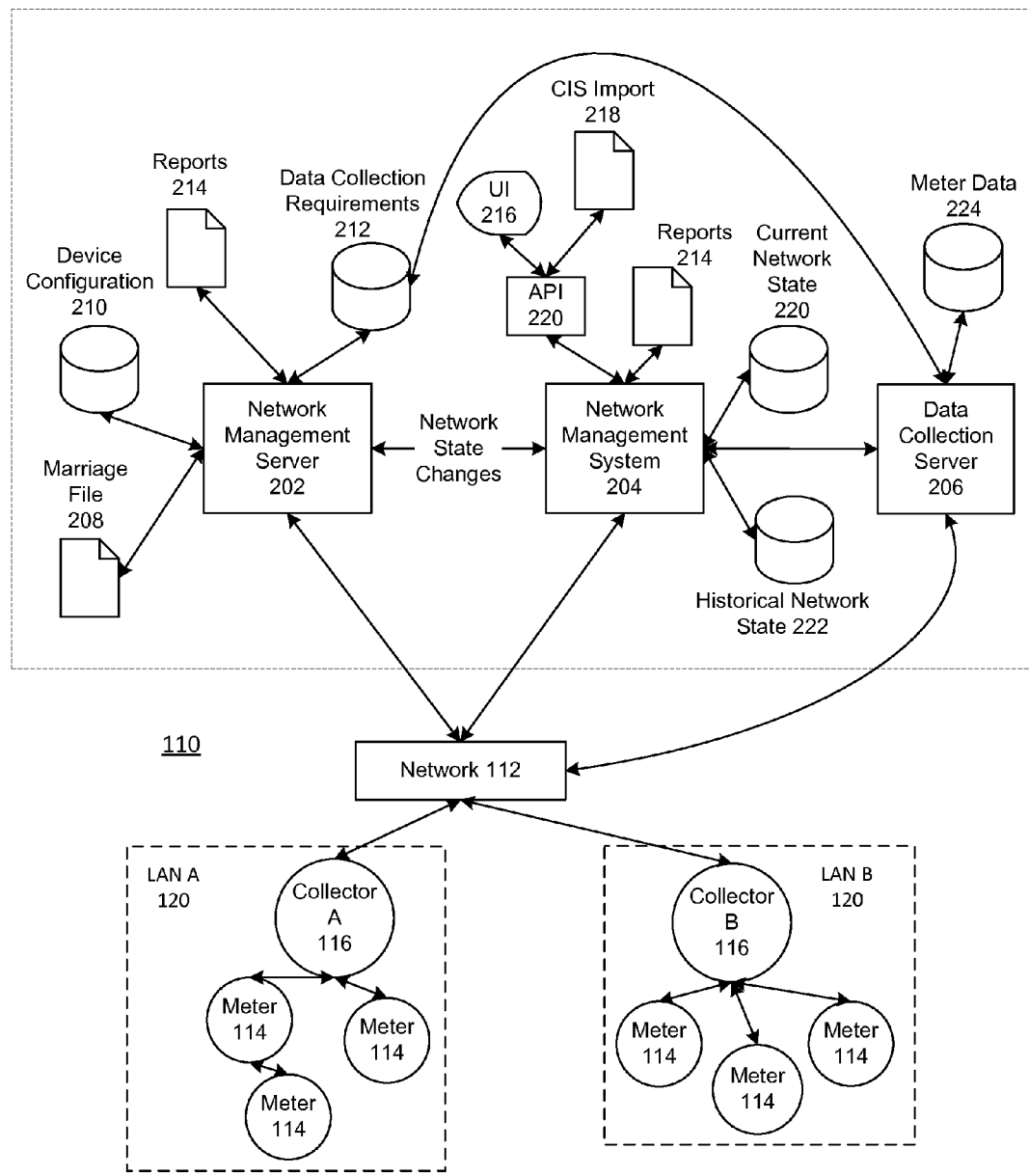
FIG. 2 expands upon the diagram of FIG. 1 and illustrates the exemplary metering system in greater detail.
Figure 3B:
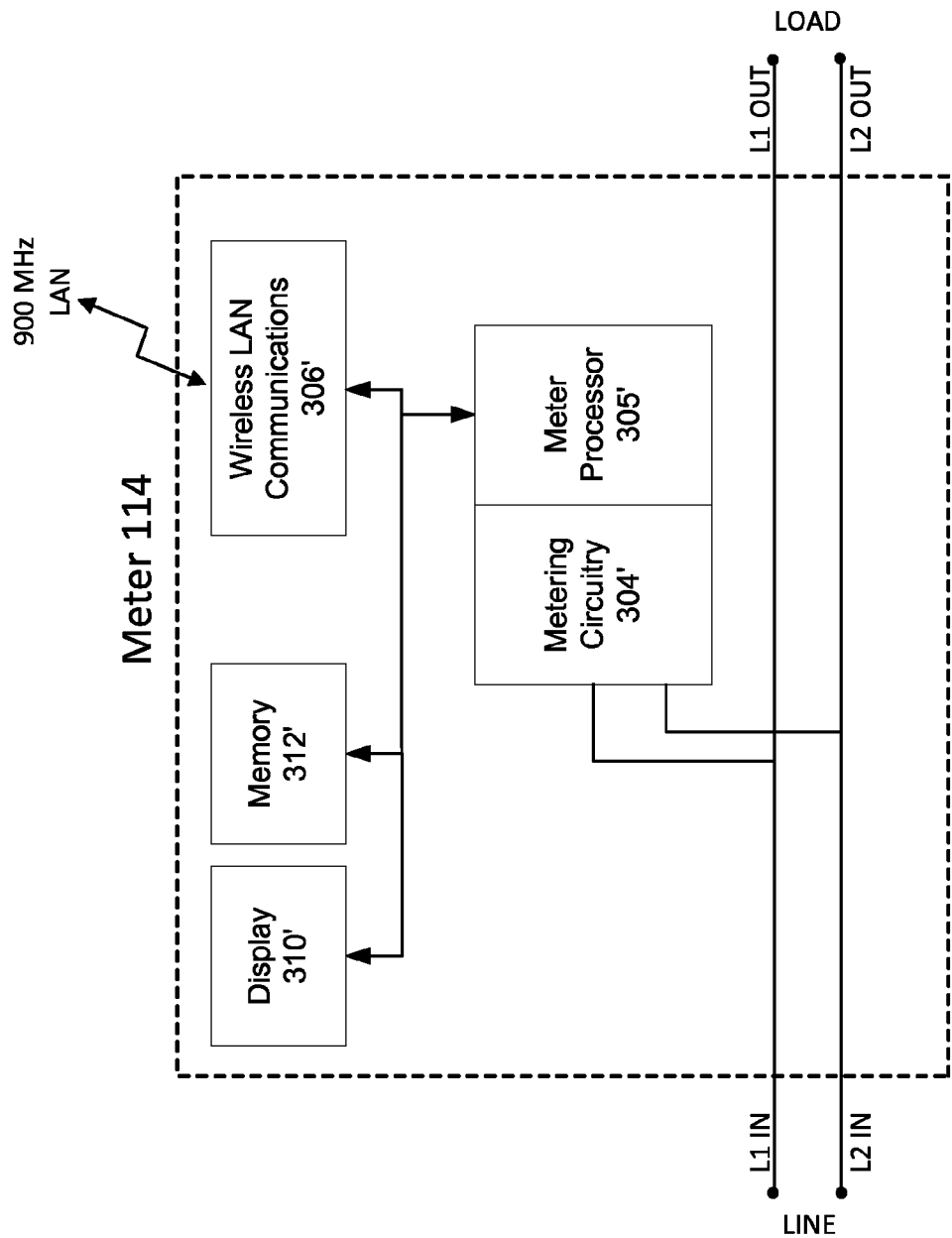
FIG. 3B is a block diagram illustrating an exemplary meter of the metering system of FIG. 1.

FIG. 3B is a block diagram of an exemplary embodiment of a meter 114 that may operate in the system 110 of FIGS. 1 and 2. As shown, the meter 114 comprises metering circuitry 304' for measuring the amount of a service or commodity that is consumed, a processor 305' that controls the overall functions of the meter, a display 310' for displaying meter data and status information, and a memory 312' for storing data and program instructions. The meter 114 further comprises wireless communications circuitry 306' for transmitting and receiving data to/from other meters 114 or a collector 116. The wireless communication circuitry 306' may comprise, for example, the aforementioned CC1110 chip available from Texas Instruments, Inc.

In one embodiment, data collected and stored in the meters 114 of the system 110 of FIGS. 1, 2, 3A and 3B is organized and extracted from each meter 114 in accordance with American National Standards Institute (ANSI) standard C12.19. The ANSI C12.19 standard defines a table structure for utility application data to be passed between an end device, such as a meter 114, and a computer, such as the Network Management Server 204 of FIG. 2. The purpose of the tables is to define structures for transporting data to and from end devices. C12.19 defines both a "standard table" structure and a "manufacturers table" structure. In this embodiment, the Network Management Server 204 includes a set of commands for reading data from, and writing data to, one or more C12.19 tables in an end device, such as a meter 114. Those commands may be transmitted to a meter 114 or other node in accordance with various wireless networking protocols and various radio communication protocols.

Interrogating Meter Devices

Methods and apparatus are described below for remotely collecting and/or providing meter data. A mobile collection device may send a message to one or more endpoints (e.g., meters and/or transponders) to retrieve data from the endpoints. For example, a collection device may send a request (e.g., interrogation) message to meters. Each meter may receive the request message. The request message may identify particular response data that should be provided from respective meters (e.g., meter data). The request message may optimize the return path for the response data. A response (e.g., from a meter device) may be time and/or frequency slotted. For example, a collection device may assign a time slot and a frequency channel that the endpoint meter may use when responding to the request. In an example embodiment, a collection device may comprise more than one receiver. In such an embodiment, different meters may respond using the same time slot by using different frequency channels. By optimizing the return path for response data, a collection device may ensure that it receives its requested data without interference.

Figure 4:
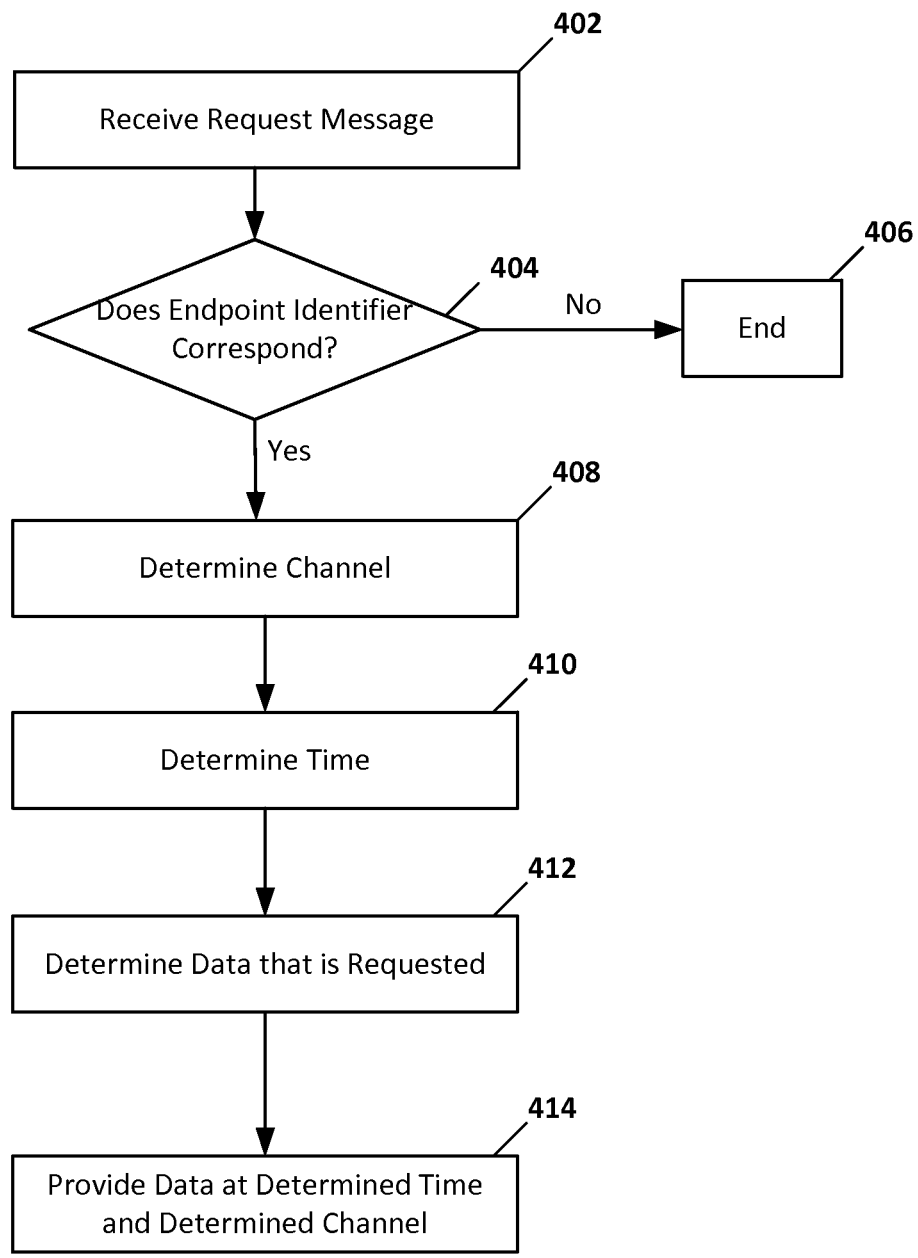
FIG. 4 is a flow diagram of an example method for retrieving data from a meter according to an example embodiment.

FIG. 4 illustrates an example method for use in an AMI system in which a collection device (e.g., a collector 116, a mobile collection device, or the like) communicates with a plurality of meter devices (e.g., such as meters 114). At 402, one or more meters may receive a request message. The request message may be sent from the collection device, for example, to retrieve meter data. The request message may comprise at least one response parameter that indicates which meters should respond to the request message. For example, the request message may comprise one or more endpoint identifiers that identify which meters should respond. The endpoint identifiers correspond to meters that should respond. For example, an endpoint identifier may comprise a serial number of an endpoint's transponder, an address of an endpoint, or various other appropriate information that identifies a meter. At 404, each endpoint that receives the request message may determine whether they should respond to the request message. For example, at 404, an endpoint may determine whether any of the endpoint identifiers in the request message correspond to it. If the endpoint determines that it is not identified in the request message, the process ends at 406. If an endpoint determines that it is identified in the request message, and thus, that the endpoint is a target of the request message, the process may proceed to step 408.

Response parameters may provide a meter with information on how to respond to a request message. At 408, an endpoint may determine a frequency channel in which it should use to respond based on at least one of the response parameters in the request message. The channel may correspond to a specific frequency, a frequency range, or the like. For example, based on a response parameter that is associated with a first endpoint meter, the first endpoint meter may respond to the request message at a first frequency channel. Similarly, the same request message may assign a second frequency channel to a second endpoint meter. The first frequency channel may or may not be equivalent to the second frequency channel. If the first frequency channel is equivalent to the second frequency channel, the first endpoint may respond to the request message during a first time slot that is different than a second time slot that the second endpoint is assigned to. Alternatively, in an example configuration in which the first frequency channel is different than the second frequency channel, the first endpoint may respond to the request message (via the frequency channel) during a first time slot that is equivalent to the second time slot during which the second endpoint may also respond (via the second frequency channel).

For example, at 410, an endpoint meter may determine a time slot during which it may respond to the request message. The time slot may be determined based on at least one of the response parameters contained in the request message. At 412, based on the response parameters, a meter may determine data that is requested by the collection device. For example, the meter may retrieve a requested table from memory, based on a response parameter comprising an application layer request. After the frequency for responding and the time slots for responding are determined, and after the data that is requested is retrieved, the endpoint meters may respond to the collection device at 414. The response may comprise the data that was requested. The response may be sent to the collection device during the determined time slot that was assigned to the transmitting meter. The response may be sent at the frequency channel that was assigned to the transmitting meter. Depending on the response parameters, more than one meter may respond (transmit) to the collection device at the same time, but at different frequencies. Similarly, depending on the response parameters, more than one meter may transmit to the collection device on the same channel, but during different time slots.

FIG. 5 shows an example request message structure. The request message may be sent (e.g., via RF) from a collection device to a plurality of metering devices in an AMI. A request message may comprise control parameters that govern responses to the request message. The control parameters may also be referred to as response parameters. As shown in the illustrated embodiment, response parameters may include a preamble length, a guard time, a number of channels per time slot, a number of endpoints, an endpoint list, and an application layer request. For example, a request message may comprise an endpoint list that identifies each meter that is being interrogated, and thus identifies each meter that may respond. The endpoint list may comprise endpoint identifiers, such as an endpoint addresses that corresponds to an endpoint meter that is being interrogated. The response parameters may comprise an RF channel that is assigned to each identified endpoint, for example, to use for a response message. Each endpoint address in the request message may correspond to an endpoint should respond to the message. The guard tick may refer to the length of time between the end of a request message and the beginning of the first time slot of the first response message(s). In an example embodiment, the location (e.g., position) of an endpoint's address in the request message may indicate a time slot that the corresponding endpoint may use to respond. The position of the address may refer to its chronological order in the endpoint list parameter. For example, an endpoint's time slot may be calculated by dividing an endpoint's position by the number of channels per slot.

A collection device may comprise one or more transceivers. In an example embodiment, a collection device may use one transceiver and the available channels (e.g., for response messages) per time slot may be equivalent to one. In another example embodiment, a collection device may use multiple transceivers and there may be multiple available channels per time slot. The response channel(s) may be selected by a collection device. Each collection device receiver may lock on a frequency (e.g., channel), for example, to receive a response message. Locking on a known frequency or frequencies may enable short preamble lengths of response messages.

Table 1 illustrates an example of a request message with exemplary control parameters, although embodiments are not limited to the attributes and/or parameters shown in Table 1.

In the example shown in Table 1, the response parameters in the request message indicate a preamble of two bytes, a guard time of five clock ticks, a time slot length of twelve clock ticks, one RF channel per time slot, three targeted endpoints, and a request that each endpoint reply with consumption data. The consumption data that is requested by the collection device may correspond to the application layer request parameters in the request message. The application layer parameter may comprise instructions to retrieve data from a particular ANSI C12.19-compliant data table. Referring to the example response parameters in Table 1, an endpoint that receives such parameters may retrieve data that corresponds to the application layer request. For example, a receiving endpoint meter may read data from table number 25, offset 10 bytes into table 25, and retrieve 15 bytes in length. The 15 bytes may be sent in a response message to a collection device. In Table 1, the example targeted endpoints are device 23 which is assigned to respond on channel 2, device 24 which is assigned to respond on channel 5, and device 25 which is assigned to respond on channels 7. As described herein, the assigned channels may correspond to frequencies or frequency ranges. Further, as described herein, Table 1 is merely exemplary, and response parameters are not so limited.

Table 2 illustrates example time slot assignments for response messages that correspond to the example response message parameters of Table 1. For example, the time slot that is represented in Table 2 is 5 milliseconds long. In accordance with the illustrated embodiment, device 23 should respond during the first time slot (e.g., 0-5 msec), for example, because device 23 is the first device in the endpoint list of the request message (Table 1). In the illustrated embodiment, device 24 is assigned to second time slot (e.g., 5-10 msec) because device 23 is in the second position in the endpoint list (see Table 1) and the response parameters indicate that there is one channel available per time slot (see Table 1).

TABLE 2

| Time = 0-5 msec | Time = 5-10 msec | Time = 10-15 msec |
| --- | --- | --- |
| Device 23 response | Device 24 response | Device 25 response |

Table 3 illustrates another example of a request message with exemplary control parameters. For example, a collection device may comprise a transmitter and multiple receivers. The "channels per slot" parameter/field (e.g., Table 3) in a request message may correspond to the number of receivers in a collection device. For example, a collection device with three receivers may send a request for three channels per time slot. Channels that may be assigned to the same time slot may be unique, for example, to prevent collisions. For example, each device from Table 3 may respond during the 0 to 5 msec time slot. The device 23 may respond on channel 2, the device 24 may respond on channel 5, and the device 25 may respond on channel 7.

TABLE 1

| Preamble Length | Guard Time | Time Slot Length | Channels per slot | Number of endpoints | Endpoint list (address and response channel | Application Layer |
| --- | --- | --- | --- | --- | --- | --- |
| 2 | 5 | 12 | 1 | 3 | 23, 2   24, 5   25, 7 | Read offset of table   25, 10, 15 |

TABLE 3

| Preamble Length | Guard Time | Time Slot Length | Channels per slot | Number of endpoints | Endpoint list (address and response channel) | | | Application Layer | | |
|---|---|---|---|---|---|---|---|---|---|---|
| 2 | 5 | 12 | 3 | 3 | 23, 2 | 24, 5 | 25, 7 | Read offset of table | 25, 10, 15 |

A collection device may send a wireless message (e.g., a request message) to devices, for example, to communicate with the devices. An application layer of the message may comprise a list of network addresses of the devices. The request message may comprise information regarding the time for each device to respond. The request message may assign a radio frequency for each device to use when responding. For example, each device may be given a specific frequency on which to respond which may correspond to a frequency of one of the receivers in the initiating device (e.g., the collection device). Thus, the receivers of the collection device may not have to scan a full channel list for incoming responses which may enable a shortened preamble in a response message.

Each addressed device (e.g., meter) may be given a time slot during which to respond to the collection device. The time slot assignments may prevent collisions among devices that are assigned to respond on the same channel. In an example embodiment, a time slot may be specified for each device in the request message. In another example embodiment, a time slot may be determined using two bytes (e.g., eight bits each) in the request message. For example, one byte (e.g., in a message header) may indicate the length of a time slot, for example, in clock ticks. By way of example, a clock tick may be defined as ⅛ of a second, although clock ticks are not so limited. A time slot length may be calculated by a device initiating the communication (e.g., a collection device), for example, based on the length of response it expects. Another byte may indicate the number of devices that may respond in each time slot. The number of devices that may respond in each time slot may correspond to the number of receivers (e.g., for receiving responses) in the initiating device. For example, a device may determine its starting response time slot by dividing its position in the address list by the number of devices per time slot to get a result, and the result may be used to determine the time slot in a chronological order. The time slot may be multiplied by the number of ticks per time slot to determine a device's response time. By way of example, if there are three channels per time slot and three endpoints, the three endpoints may respond in the first chronological time slot (e.g., 3/3) using different channels. By way of further example, if there are six devices and there are three channels per time slot, the first three devices may respond in the first chronological time slot and the second three devices may respond in the second chronological time slot. After a request message is received by one or more targeted devices, the first message response time may be synchronized between each of the targeted devices based on the end time of the request message. For example, after the request message expires, the targeted meters that are assigned to the first time slot may wait for the guard ticks to expire and then may begin transmission of their response messages.

Narrow Band Wake-Up Tone

Methods and apparatus are described below for remotely waking up meters. For example, a collection device may wake a meter from a low power state before it interrogates the meter or during interrogation of the meter, as described above. Smart meter systems and other electrically powered devices may spend time in a low power mode that is often referred to as a sleep mode. A device, such as collection device or other device having a transmitter, may wake these devices from a sleep mode by transmitting a wake-up tone which may be received by the device at a carrier frequency. A narrow band wake-up tone may individually wake-up sleep enabled devices over-the-air in the VHF/UHF band with minimum current consumption in the device. The narrow band wake-up tone may wake-up multiple devices using a broadcast tone. Address information may be modulated in the wake-up tone. The wake-up tone may allow a tone detector to efficiently detect the validity of a tone to wake-up. The wake-up tone may allow unwanted signals to be invalidated and/or discarded to return a device to a low power mode. A wake-up tone may enable a long-range wake-up.

According to embodiments described herein, smart meter systems and/or AMI networks may comprise electrically powered meters that may spend time in a low power sleep mode (e.g., to preserve battery life). Devices (e.g., battery operated meters) may awake from a sleep mode via a trigger such as a mechanical sensor, a magnet (e.g., activating a hall-effect sensor), and/or a radio signal for example. A radio signal comprising a wake-up tone may be received by a meter at a carrier frequency and/or may be sent by a wireless device (e.g., a collection device). A narrow band wake-up tone may individually wake-up sleep enabled metering devices over-the-air and/or a narrow band wake-up tone may wake-up multiple metering devices, for example, by using a broadcast tone. A wake-up tone may be received in a licensed VHF/UHF band by a meter device at a carrier frequency. For example, a licensed VHF/UHF band may allow for signals of increased signal strengths. Receiving device complexity and/or current consumption may be minimized, for example, by monitoring a carrier frequency. A meter device may wake-up from a sleep mode while consuming little current. Address information (e.g., corresponding to a device and/or multiple devices) may be modulated in the wake-up tone, for example, to ensure desired meter(s) are awoken and/or to minimize time that meters may be in an active power state (e.g., awaiting communication). For example, a wake-up tone may allow a tone detector to efficiently detect the validity of a tone. Devices may discard unwanted, false, and/or interference signals and the device may be returned to a low power state (e.g., sleep). A wake-up tone may allow long-range wake-up and may allow a mobile transceiver (e.g., mobile collection device) to wake-up a meter and communicate with the meter (e.g., read a meter configuration) while passing at various speeds.

Figure 6:
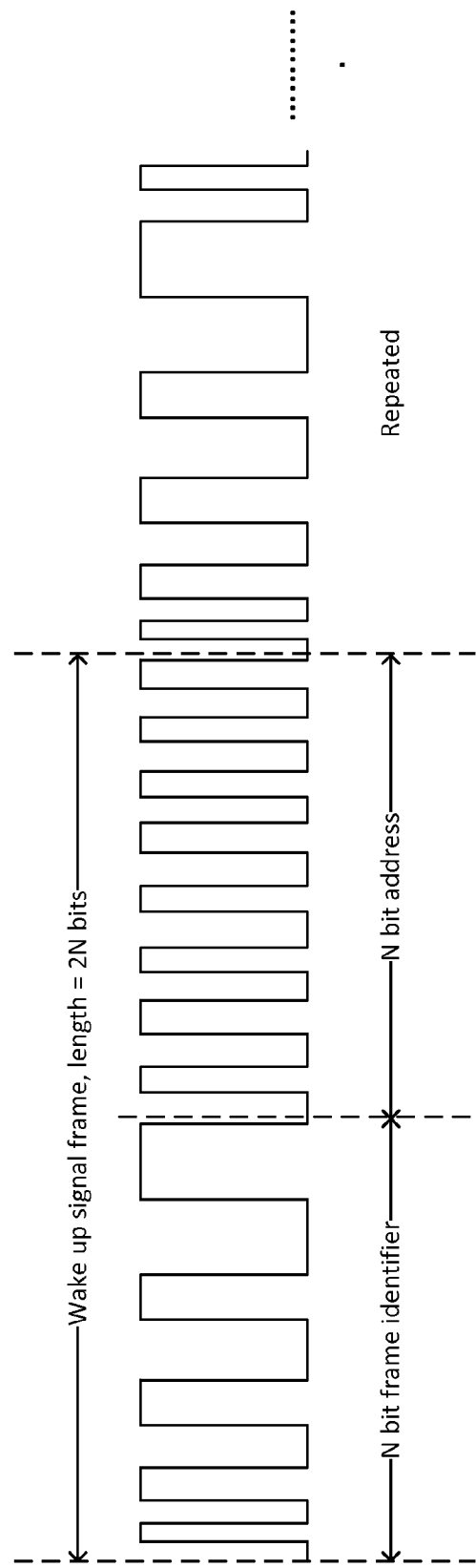
FIG. 6 shows an exemplary frame format for a wake-up tone according to an example embodiment.

FIG. 6 shows an example of a digital format of a narrow band wake-up tone according to an embodiment. For example, a wake-up tone frame may comprise 2N bits and/or may comprise a known frame identifier bit sequence (e.g., frame identifier word). A frame identifier bit sequence may allow decoder bit synchronization and may be followed by device addressing information. The frame identifier word may be selected without pattern repetition between falling to falling edges and/or rising to rising edges, for example, to allow the decoder to identify the frame identifier word position in the frame without locking on a partial frame identifier word or partial addressing information. A frame identifier word may also be selected to maximize the number of edges in the frame identifier bit stream, for example, to give the decoder a maximum number of bit value transitions for symbol to bit synchronization detection. The bit length of the frame identifier word (shown as equal to N in FIG. 6) may be greater than or equal to the bit length of the address frame identifier word length (shown as equal to N in FIG. 6), for example, to enable the decoder to accurately identify the frame in a sequence of received bits. Following the frame identifier word may be the addressing information which may define which device (or devices) for which the wake-up tone is intended. The wake-up tone frame may be repeated and/or transmitted at a data rate of 1562.5 bits/s, for example.

A narrow band wake-up tone may be sent over-the-air to wake battery operated and/or other sleep enabled devices, such as devices with a low active duty cycle for example. Smart meter systems may use wake-up tones having carrier frequencies in the very high frequency (VHF) and/or ultra-high frequency (UHF) bands. The digital frame of the wake-up tone may be encoded with Manchester encoding, for example, to prevent a long sequence of the same symbol from being transmitted. Manchester encoding may output two symbols per bit. For example, a data rate after encoding may be equal to 3125 symbols/s (e.g., 2×1562.5 bits/s). The encoded tone digital baseband signal may be filtered through a Gaussian filter, for example, to minimize bandwidth and fit into a narrow band VHF/UHF (e.g., 12.5 kHz channel bandwidth) signal. The filtered baseband signal may be modulated using frequency shift keying (FSK) with narrow deviation (e.g., 3.125 kHz), which may produce a Gaussian FSK (GFSK) signal.

The wake-up tone may be capable of operating in an individually addressable mode or a broadcast mode. For example, the individually addressable mode may wake the device having an address corresponding to an address in the tone. The broadcast mode may wake-up any device that hears the tone. The information in the wake-up tone that comprises an address may be referred to as a wake-up address of the device. The wake-up address may be the broadcast address and/or the device's individual address. A device may awake from a sleep mode when it receives the wake-up tone encoded with a corresponding wake-up address. Wake-up tones with an address reserved for broadcast may wake-up any device that hears the tone. According to an example embodiment, wake-up tones may be repeated by a transmitter. Transmitters may transmit wake-up tones without interruption. Transmitters (e.g., collection devices) may transmit wake-up tones for a period of time at least equivalent to the receiver listen interval. If the received address information matches the device's address or matches the broadcast address, the device may enter a fully active state. For example, a meter that wakes up may enter its fully powered state to perform tasks, such as processing meter information or communicating with other devices for example, before returning to sleep mode.

Figure 7:
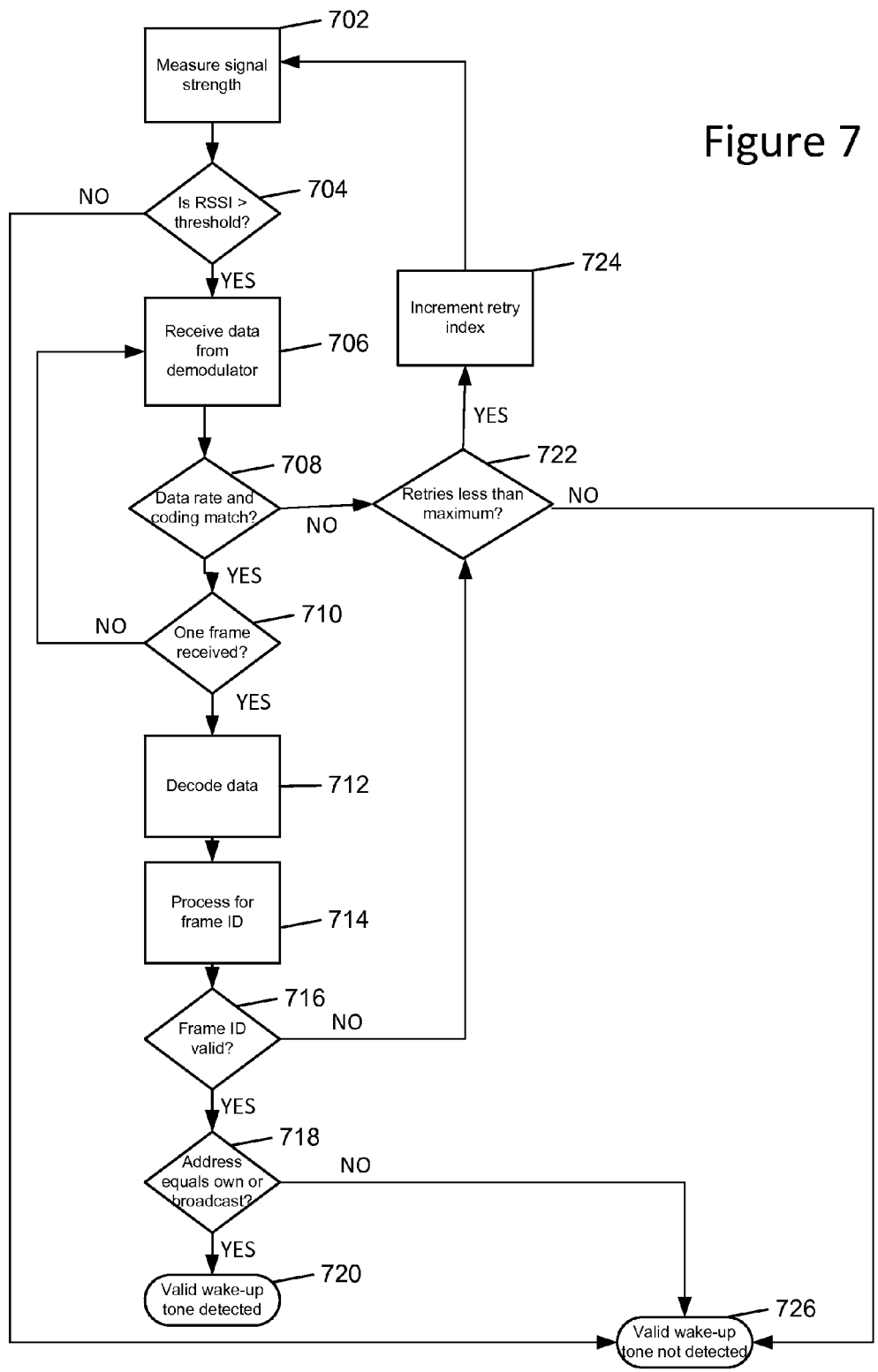
FIG. 7 is a flow diagram of an exemplary method for waking a metering device from a sleep mode.

FIG. 7 illustrates an exemplary method for waking a metering device from a sleep mode. A sleeping, wake-up tone enabled device, such as a battery powered meter for example, may comprise a receiver that enters an active state periodically to listen for energy at a wake-up tone carrier frequency. At step 702, the receiver may measure the signal strength of a received signal having the carrier frequency. A test at step 704 may determine if the received signal strength indication (RSSI) is greater than a predefined threshold. A threshold may be selected that is sufficiently greater than the receiver sensitivity level and the expected noise floor, for example, so as to increase reliability of tone detection and minimize processing (e.g., reduce battery consumption) of unwanted signals (e.g., interference) in the band.

If the measured signal strength is not greater than a predefined threshold, a valid wake-up tone is not detected (step 726). If the measured signal strength is greater than a predefined threshold, the process may proceed to step 706 where the receiver may stay in a receive mode and may collect digital symbol information, for example, from a GFSK demodulator. A test at step 708 may determine whether the received data rate matches the expected data rate of the wake-up tone. The test at step 708 may determine whether the received coding scheme matches the expected coding scheme (e.g., Manchester encoding). The data rate may be verified continuously at step 708 by measuring the time between edges in the demodulator output signal. By continuously validating Manchester encoding, for example, by verifying that no three continuous bits are of the same value, an invalid tone falling within the same data rate as an expected tone may be identified and discarded. If the test at step 708 determines that the received data rate matches the tone transmission data rate and the received coding follows expected encoding rules, the process may proceed to step 710. At step 710, the receiver may determine whether one frame of data (e.g., 4N symbols) has been received. If one frame of data has been collected, the process may proceed to step 712 where the data is decoded. If the receiver has not collected one frame of data, the process may return to step 706 where more data may be collected from the demodulator.

The data symbols may be decoded (e.g., Manchester decode) to bits (e.g., 4N symbols are decoded to 2N bits) at step 712. The decoded frame may be processed for the frame identifier word at step 714. The beginning of the frame identifier word may appear at any bit position in the set of collected bits. For example, the repetition of the tone frame (as shown in FIG. 6) may allow the frame identifier word to wrap around to the beginning from any of the bit positions 2N−1 to position 0. Processing the frame identifier at step 714 may comprise rotating the decoded bits in the bit window (e.g., bit window length=2N bits) until the leading N bits match the pattern of the frame identifier word, over an example maximum of 2N−1 rotations. A test at step 716 may determine if a valid frame identifier word may be found in the collected bits. If a valid frame identifier word is found, the N bits following the frame identifier may represent the addressing information, and the process may proceed to a test at step 718. The test at step 718 may determine whether the received address matches a wake-up address, such as the device's individual address and/or a broadcast address for example. If an address is matched at step 718, a valid wake-up tone may be detected (step 720). When a valid wake-up tone is detected by a device, the device may enter its fully powered, active state.

If the collected symbols are not decoded, for example, because the test at step 708 determines that the received data does not follow Manchester encoding rules for example, the process may proceed to a test at step 722. Similarly, the process may proceed to step 722 if the test at step 716 determines that a valid frame identifier word is not within the decoded frame. The test at step 722 may determine whether an amount of retry attempts is greater than a predetermined maximum number of retry attempts. For example, if there is still energy above the threshold at the carrier frequency, the receiver may attempt a configurable number of retry attempts to collect a frame for decoding and processing. If test at step 722 determines that the current number of retry attempts is less than the preconfigured maximum number of retry attempts, the process may proceed to step 724 where a retry index is incremented by one, and then the process may return to step 702 where the received signal strength is measured. If the maximum number of retry attempts has been reached, the device may return to sleep, for example, because a valid wake-up tone is not detected (e.g., as indicated at 726). Similarly, if the test at step 718 determines that the received address does not match a wake-up address for the device, no retries may be made and the device may return to sleep (e.g., because no valid wake-up tone was detected, as indicated at 726). If the data rate does not match the expected data rate of the wake-up tone (determined at step 708), the receiver may immediately shut down and/or the device may return to sleep until the next wake-up tone listen interval. In an example embodiment, a tone decoder with tolerance on the edge detection may allow possible data rate drift induced by inconsistencies such as crystal variance over temperature, crystal drift, and/or jitter for example.

Mobile Meter Reading

As described herein, mobile automated meter reading (AMR) systems may read endpoints and/or transponders attached to gas, water, and/or electric meters over radio frequency (RF). Transponders may be read by receiving a bubble up message from the transponder (one-way), sending out a wake-up tone and receiving a reply (one and a half way or 1.5-way), and/or by sending out a command and receiving a reply (two-way). In an example embodiment, an algorithm may be used that may restrict the transponder being interrogated to a transponder in the perpendicular direction from which an interrogation vehicle (e.g., van based mobile collection device) is traveling. Transponders may be interrogated at an increased speed by interrogating transponders in the direction of travel. In an example embodiment, a user is allowed to adjust the interrogation profile.

As described herein, various communication protocols may be used in AMR mobile collection systems. In the bubble up (e.g., one-way) protocol, the transponder may broadcast its meter read in such a way that the mobile interrogator may listen to receive the data. In the wake-up (e.g., 1.5-way) protocol, the mobile interrogator may transmit a wake-up tone. A transponder which hears the wake-up tone may respond with its meter reading data. In the two-way protocol, the mobile interrogator may send out a command directed at a particular transponder, for example, using its serial number and/or other identifier to request the particular endpoint that should reply. The utility may have the GPS coordinates of each meter and may download the coordinates to the AMR system. The AMR system may comprise GPS information which may allow the system to show the route visually, for example, with icons used to display where the transponders are located.

Mobile interrogators may use displays to show locations of meters as a route is being read. In an example embodiment described herein, an algorithm may determine which transponder(s) are in a window. The algorithm may focus interrogation on transponders in the direction that an interrogation vehicle is traveling. The algorithm may be flexible and may support rural, suburban, and/or urban gas, water, and/or electric meter deployments. The algorithm may increase the speed at which a route may be driven while meters are interrogated and data is collected.

For example, a mobile interrogator may receive or determine a route and/or a set of endpoints that need to read (interrogated). The endpoints, for example, may comprise RF transponders attached to gas, electric, and/or water meters. Each transponder in the route may comprise certain information associated with it such as, for example, GPS coordinates, a meter number, and an address. A mobile interrogator device (e.g., collection device) may comprise a radio-based communications component that may generate a wake-up tone as described herein, may generate a command directed at a specific transponder, may transmit a request message as described herein, and may receive response messages. A wake-up tone, two-way command, and/or responses may be at the same or different RF frequencies with respect to each other. For example, the mobile interrogator may determine a group of transponders that is within a range based on the direction in which the interrogator is traveling. Each transponder in the group may correspond to a metering device. The mobile interrogator may determine an identity that is associated with each transponder in the group of transponders that is within its interrogation range. The interrogator may assign, via a request message, each transponder in the group to a respective frequency channel and a respective time slot for responding, as described above. The interrogator may also encode a wake-up tone with a wake-up address corresponding to at least one of the transponders in the group, as described above. For example, the mobile interrogator may transmit a wake-up tone to at least one transponder that is within the determined range, thereby waking a metering device that corresponds to the at least one transponder.

In an example embodiment, the speed a vehicle may travel while reading transponders may be increased by reading transponders in the direction perpendicular to the vehicle's movement. For example, a radial direction of 'r' in the forward direction and '0.5r' in the perpendicular direction may be utilized to determine which transponders are in a reading range. According to an example embodiment, a user may alter and/or expand a range of transponders by pointing a meter reading vehicle in the direction that the user wishes to have the expanded interrogation range. For example, the user may form multiple interrogation shapes. The size of 'r' may be adjusted (e.g., by the interrogator user) to adapt to different scenarios, such as rural, suburban, and/or urban meter scenarios for example, during route interrogation. The mobile reading system (e.g., firmware) may adjust the size of 'r', for example, based on GPS parameters.

In an example embodiment, a constant line of latitude and longitude may be calculated using a combination of the following equations:

Latitude_max=present latitude+lat_delta;

Latitude_min=present latitude+lat_delta;

Longitude_max=present longitude+long_delta;

Longitude_min=present longitude+long_delta;

Lat_delta=($a$ sin(0.5*intr_win/earth_radius))/$PI$*0× 1000000; and

Lat_delta=($a$ sin(0.5*intr_win/earth_radius/cos(lat)))/ $PI$*0×1000000.

In another example embodiment, a radial direction of 'r' in the forward direction and '0.5r' in the perpendicular direction may be utilized to determine which transponders are in a reading range. For example, a distance may be calculated to four corners using a combination of the following equations:

distance1=square root of 5*(intr_win)/2;

dis_lat1=(distance1*sin(GPS_angle+a sin(1/sqrt (5))));

dis_long1=(distance1*cos(GPS_angle+a sin(1/sqrt (5))));

dis_lat2=(distance1*sin(GPS_angle−a sin(1/sqrt (5)))); and dis_long2=(distance1*cos(GPS_angle−a sin(1/sqrt (5)))).

A change in latitude and/or longitude may be determined. For example, a change in latitude and/or longitude to the four corners may be determined using a combination of the following equations:

//estimate delta lat and long from the delta distance of point 1 lat_delta_1=a sin(dis_lat1/earth_radius)*0×1000000/ pi;

lon_delta_1=a sin((dis_long1)/(earth_radius*cos (latitude*degrees_to_radians)))*0×1000000/pi;

//calculate point 2 lat_delta2=a sin(dis_lat2/earth_radius)*0×1000000/ pi;

lon_delta_2=a sin((dis_long2)/(earth_radius*cos (latitude*degrees_to_radians)))*0×1000000/pi;

//calculate max deltas lat_delta=(unsigned int)(max(abs(lat_delta_1),abs (lat_delta_2))+0.5); and lon_delta=(unsigned int)(max(abs(lon_delta_2),abs (lon_delta_1))+0.5).

The latitude and longitude of the corners may be determined, for example, by using a combination of the following equations:

y1=lat+lat_delta_1;

x1=−1*(lon−lon_delta_1);

y2=lat+lat_delta_2;

x2=−1*(lon−lon_delta_2);

x3=−1*(lon+lon_delta_2);

y3=lat−lat_delta_2;

x4=−1*(lon+lon_delta_1); and y4=lat−lat_delta_1.

The slope and intercept of two lines parallel to the car movement may be determined, such as by using a combination of the following equations for example:

Slope=(y1−y3)/(x1−x3);

Intercept 1=y1−Slope*x1; and

Intercept 2=y2−Slope*x2.

The mobile interrogator may handle a case where (x1-x3) is equal to zero. At the last step, the mobile interrogator may determine if a point is between the two calculated lines (e.g., determine whether a transponder is in range).

All or portions of the methods and apparatus described herein for collecting meter data from an AMI system may be embodied in hardware, software, or a combination of both. When embodied in software, the methods and apparatus of the present invention, or certain aspects or portions thereof, may be embodied in the form of program code (e.g., computer executable instructions). This program code may be stored on a computer-readable medium, such as a magnetic, electrical, or optical storage medium, including without limitation, a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A device on which the program code executes, such as meter 114', will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language. When implemented on a general-purpose processor, the program code may combine with the processor to provide a unique apparatus that operates analogously to specific logic circuits.

While systems and methods have been described and illustrated with reference to specific embodiments, modifications and variations may be made without departing from the principles described above and set forth in the following claims. For example, although in the embodiments described above, the systems and methods of the present invention are described in the context of a network of metering devices, such as electricity, gas, or water meters, it is understood that the present invention can be implemented in any kind of network. Also, embodiments can be implemented by metering systems in a mobile (walk by/drive by) system and a fixed network. Accordingly, reference should be made to the following claims as describing the scope of the present invention.

What is claimed:

1. In an advanced metering infrastructure system in which a collection device can retrieve data from a plurality of metering devices, a method comprising:
    receiving, by a first metering device of the plurality of metering devices, a signal having a carrier frequency;
    determining whether the received signal is a valid wake-up tone based at least on whether a measured signal strength of the received signal is greater than a predetermined threshold and whether an address encoded within the received signal matches a wake-up address of the first metering device;
    if the address encoded within the received signal matches the wake-up address receiving, by the first metering device of the plurality of metering devices, a request message via the collection device, the request message comprising response parameters that comprise a first endpoint identifier;
    determining, based on at least one of the response parameters in the request message, a first time slot in which to respond to the request message;

determining, based on at least one of the response parameters in the request message, a first frequency channel for responding to the request message; and responding, by the first metering device associated with the endpoint identifier, to the request message during the determined first time slot and at the determined first frequency channel such that the collection device retrieves at least a first portion of the data.

2. The method recited in claim 1, wherein the response parameters comprise at least one of a preamble length, a guard time, a time slot length, a number of channels per time slot, a number of endpoints, an endpoint list, or an application layer request.

3. The method recited in claim 1, wherein the request message further comprises a second endpoint identifier, the method further comprising:

determining, by a second metering device of the plurality of metering devices based on at least one of the parameters in the request message, a second frequency channel for responding to the request message; and responding, by the second metering device associated with the second endpoint identifier, to the request message during the determined first time slot and at the determined second frequency channel such that the collection device retrieves at least a second portion of the data.

4. The method recited in claim 1, wherein the request message further comprises a second endpoint identifier, the method further comprising:

determining, by a second metering device of the plurality of metering devices based on at least one of the parameters in the request message, a second time slot in which to respond to the request message; and responding, by the second metering device-having the second endpoint identifier, to the request message during the determined second time slot and at the determined first frequency channel such that the collection device retrieves at least a second portion of the data.

5. The method recited in claim 1, wherein the response parameters comprise an application layer request, the method further comprising:

based on the application layer request, retrieving the first portion of the data from an ANSI C12.19-compliant data table.

6. The method recited in claim 1, wherein the collection device comprises a number of receivers, and wherein the response parameters comprise a number of channels per time slot, the number of channels per time slot equivalent to the number of receivers.

7. The method of claim 1, further comprising:

if the measured signal strength is not greater than the predetermined threshold, then determining that the received signal is not a valid wake-up tone.

8. The method of claim 1, further comprising:

if the address encoded within the received signal does not match a wake-up address of the first metering device, then determining that the received signal is not a valid wake-up tone.

9. The method of claim 1, further comprising:

if the measured signal strength is greater than the predetermined threshold and if the address encoded within the received signal matches a wake-up address of the first metering device, then determining that the received signal is a valid wake-up tone.

10. A metering device that measures consumption of a commodity, the metering device associated with an endpoint identifier, the metering device comprising:

a communication interface configured to receive a signal having a carrier frequency, and if the received signal is a valid wake-up tone receive a request message from a collection device, the request message comprising response parameters that comprise the endpoint identifier;

a memory containing one or more ANSI C12.19-compliant data tables; and a processor that operates to:

determine whether the received signal is a valid wake-up tone based at least on whether a measured signal strength of the received signal is greater than a predetermined threshold and whether an address encoded within the received signal matches a wake-up address of the first metering device;

determine, based on at least one of the response parameters in the request message, a first time slot in which to respond to the request message; and determine, based on at least one of the response parameters in the request message, a first frequency channel for responding to the request message.

11. The metering device recited in claim 10, wherein the communication interface is further configured to respond to the request message during the determined first time slot and at the determined first frequency channel.

12. The metering device recited in claim 10, wherein the response parameters comprise at least one of a preamble length, a guard time, a time slot length, a number of channels per time slot, a number of endpoints, an endpoint list, or an application layer request.

13. The metering device recited in claim 10, wherein the response parameters comprise an application layer request, the processor further configured to:

retrieve, based on the application layer request, data from an ANSI C12.19-compliant data table, the data corresponding to data requested by the collection device.

14. The metering device recited in claim 10, wherein the processor further operates to:

measure a signal strength of the received signal having the carrier frequency;

determine whether the received signal is a valid wake-up tone based at least in part on whether the measured signal strength is greater than a predetermined threshold; and determine whether the received signal is a valid wake-up tone based on whether an address encoded within the received signal matches a wake-up address of the metering device.

15. In an advanced metering infrastructure system in which a mobile interrogator vehicle communicates with a plurality of metering devices to retrieve data, a method of controlling the plurality of metering devices, the method comprising:

the mobile interrogator vehicle traveling in a direction;

based on the direction, determining a group of transponders that are within a range for interrogation, each transponder in the group corresponding to a metering device of the plurality of metering devices;

determining an identity associated with each transponder in the group of transponders, each identity associated with each transponder associated with an endpoint identifier;

transmitting a request message to the group, the request message comprising a request for the data;

assigning, via the request message, each transponder in the group to a respective frequency and a respective time slot;

receiving the requested data, via the transponders, at the assigned frequencies and time slots;

encoding a wake-up tone with a wake-up address corresponding to at least one of the transponders in the group; and transmitting, by the mobile interrogator vehicle, the wake-up tone to the at least one transponder, such that a measured signal strength of the wake-up tone is greater than a predetermined threshold, thereby waking a metering device that corresponds to the at least one transponder before transmitting the request message to the metering device.

\* \* \* \* \*